United States Patent
Clute et al.

(10) Patent No.: US 10,053,051 B2
(45) Date of Patent: Aug. 21, 2018

(54) SEAT BELT RETRACTOR WITH A VELOCITY-CONTROLLED LOAD LIMITING DEVICE

(71) Applicant: Autoliv Development AB, Vårgårda (SE)

(72) Inventors: Günter Clute, Elmshorn (DE); Hiroki Matsuoka, Tsukuba (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 61 days.

(21) Appl. No.: 15/116,841

(22) PCT Filed: Feb. 5, 2015

(86) PCT No.: PCT/EP2015/052385
§ 371 (c)(1),
(2) Date: Aug. 5, 2016

(87) PCT Pub. No.: WO2015/118054
PCT Pub. Date: Aug. 13, 2015

(65) Prior Publication Data
US 2017/0182973 A1 Jun. 29, 2017

(30) Foreign Application Priority Data
Feb. 6, 2014 (DE) .................. 10 2014 202 142

(51) Int. Cl.
*B60R 22/405* (2006.01)
(52) U.S. Cl.
CPC .................. *B60R 22/405* (2013.01)

(58) Field of Classification Search
CPC ............................ B60R 22/405; B60R 22/40
See application file for complete search history.

(56) References Cited

U.S. PATENT DOCUMENTS

| | | | |
|---|---|---|---|
| 4,206,887 A | 6/1980 | de Rosa | |
| 4,483,494 A | 11/1984 | Takada | |

(Continued)

FOREIGN PATENT DOCUMENTS

| | | |
|---|---|---|
| DE | 20207276 U1 | 9/2002 |
| DE | 102005016822 B3 | 1/2007 |

(Continued)

OTHER PUBLICATIONS

European Patent Office, Rijswijk, Netherlands, International Search Report of International Application PCT/EP2015/052385, dated May 11, 2015, 2 pages.

*Primary Examiner* — Sang K Kim
(74) *Attorney, Agent, or Firm* — Brinks Gilson & Lione

(57) ABSTRACT

A seat belt retractor includes a belt shaft pivot-mounted in a retractor frame, wherein the belt shaft shows an at least two-part design with a first and a second part. A load limiting device includes at least two parts, which can be moved relative to each other and have teeth, with which they alternately engage and disengage. Each of the parts of the load limiting device is allocated to a different part of the belt shaft. A tensioning device is located on the second part of the belt shaft and, upon activation, abruptly drives the belt shaft in the winding direction. One of the parts of the load limiting device, via a transmission device, is connected in a rotationally-fixed manner to the second part of the belt shaft through the first part, which is a hollow shaft.

8 Claims, 4 Drawing Sheets

(56) References Cited

U.S. PATENT DOCUMENTS

| | | |
|---|---|---|
| 4,943,011 A | 7/1990 | Kitamura et al. |
| 5,297,752 A | 3/1994 | Brown et al. |
| 5,601,251 A | 2/1997 | Hishon et al. |
| 5,636,806 A | 6/1997 | Sayles |
| 5,769,345 A | 6/1998 | Morner et al. |
| 6,098,772 A | 8/2000 | Kimmig et al. |
| 6,260,782 B1 | 7/2001 | Smithson et al. |
| 6,409,115 B1 | 6/2002 | Specht et al. |
| 6,443,382 B1 | 9/2002 | Bae |
| 6,454,201 B1 | 9/2002 | Strobel et al. |
| 6,871,813 B2 * | 3/2005 | Bae .................. B60R 22/3413 242/379.1 |
| 6,932,324 B2 | 8/2005 | Biller et al. |
| 8,529,398 B2 | 9/2013 | Jabusch |
| 2002/0190515 A1 | 12/2002 | Birk et al. |
| 2003/0201357 A1 | 10/2003 | Koning et al. |
| 2005/0059524 A1 | 3/2005 | Hori et al. |
| 2005/0133330 A1 | 6/2005 | Stiefvater |
| 2011/0291396 A1 * | 12/2011 | Tanaka ................ B60R 22/4633 280/806 |
| 2013/0320127 A1 | 12/2013 | Singer et al. |

FOREIGN PATENT DOCUMENTS

| | | |
|---|---|---|
| DE | 102008049931 A1 | 5/2010 |
| DE | 102009010435 A1 | 9/2010 |
| DE | 102011008405 A1 | 7/2012 |
| DE | 102011101515 A1 | 11/2012 |
| DE | 102012209239 A1 | 12/2013 |
| DE | 102012209355 A1 | 12/2013 |
| EP | 1069009 A1 | 1/2001 |
| EP | 1222097 A1 | 7/2002 |
| FR | 2528928 A1 | 12/1983 |
| WO | 2003/020557 A1 | 3/2003 |
| WO | 2004/096611 A1 | 11/2004 |
| WO | 2006/108451 A1 | 10/2006 |
| WO | 2007/130041 A1 | 11/2007 |
| WO | 2010/037460 A2 | 4/2010 |
| WO | 2010/139433 A1 | 12/2010 |
| WO | 2012/095133 A1 | 7/2012 |

* cited by examiner

SEAT BELT RETRACTOR WITH A VELOCITY-CONTROLLED LOAD LIMITING DEVICE

CROSS-REFERENCE TO RELATED APPLICATIONS

The present application is the National Stage of international application PCT/EP2015/052385, filed on Feb. 5, 2015, which claims priority to German application 10 2014 202 142.1, filed on Feb. 6, 2014. Both of these applications are herewith incorporated by reference in their entirety.

TECHNICAL FIELD

The invention relates to a seat belt retractor with a velocity-controlled load limiting device.

BACKGROUND

The publication WO 2006/108451 A1 originating with the applicant discloses for example a velocity-controlled load limiting device for a seat belt retractor comprising several masses to be oscillated which are located on the frame of the seat belt retractor. The masses are pivot-mounted on the retractor frame and, during the load-limited belt webbing extraction, with two teeth alternately engage into a toothed ring connected to the belt shaft. All told, the seat belt retractor is high-priced and its manufacture is time-consuming due to the oscillating masses located on the retractor frame. Furthermore, due to the oscillating masses, the seat belt retractor requires a relatively large installation space.

The German Patent Application 10 2008 049 931 A1 originating with the applicant as well discloses an improved load limiting device functioning on the basis of the same physical principle, in which two toothed parts are moved relative to each other in a load-limited manner, with one of the parts at the same time performing a wave-like feed motion during which the teeth alternately engage and disengage. The part performing the wave-like feed motion substitutes the oscillating masses, so that the load limiting device disclosed therein requires a significantly smaller installation space and shows a design that is much more simplified. In one embodiment, the part performing the wave-like feed motion is realized by a toothed disc which is connected to the belt shaft by a non-positive connection.

Furthermore, publication DE 10 2009 010 435 A1 discloses a seat belt retractor with a velocity-controlled load limiting device, in which the load limiting device for activation with one part is fixed at the frame of the seat belt retractor, and with another part can be coupled to the belt shaft. The part with which the load limiting device can be coupled to the belt shaft is designed as a rotatable toothed ring, into which a locking pawl mounted on the belt shaft engages. During the load-limited belt extraction movement, the torque is transmitted by the toothed ring via axial fingers to a toothed oscillating disc, which thereupon is driven to a rotational movement with a superimposed transverse oscillatory motion, and which thereby alternately engages into and disengages from teeth provided on the frame of the seat belt retractor. During this rotational movement, the oscillating disc is periodically accelerated and decelerated, and this is how the energy dissipation forming the basis of the load limitation is effected. One disadvantage of this embodiment is to be seen in that the toothed ring upon activation of the locking device needs to show a certain alignment relative to the engaging locking pawl in order that the locking pawl does not pseudo-lock at a front of the teeth of the toothed ring. The engaging movement of the locking pawl thus needs to be effected in synchronization with the alignment of the toothed ring, what in turn may be a problem insofar as the alignment of the toothed ring itself is defined by the same being mounted on the retractor frame. As the alignment of the toothed ring, due to manufacturing tolerances of the toothed ring itself and of the attachment points on the retractor frame, is subject to a certain unavoidable tolerance, the synchronization of the motion of the locking pawl is further complicated.

Furthermore, publication DE 10 2011 008 405 A1 discloses an improved velocity-con-trolled load limiting device for a seat belt retractor with a two-part belt shaft, in which one of the parts of the load limiting device is allocated to one part of the belt shaft, and the other part of the load limiting device is allocated to another part of the belt shaft. The load limiting device in this case is activated by one of the parts of the belt shaft together with the related first part of the load limiting device being locked in a vehicle-fixed manner in the event of an accident, and the respective other part of the belt shaft together with the respective other second part of the load limiting device starting to rotate relative to the first part of the load limiting device when a predetermined belt extraction force is exceeded.

Furthermore, modern seat belt retractors may be provided with pyrotechnical high-performance belt tensioners, which are activated in an early phase of the accident prior to the activation of the load limiting device and pull existing belt slack out of the safety belt, so that subsequently the occupant is coupled to the vehicle deceleration at an earlier stage.

The solution known from publication DE 10 2011 008 405 A1 describes a seat belt retractor with a tensioning device comprising a drive wheel mounted in a rotationally-fixed manner on a part of the belt shaft, which can be locked in a vehicle-fixed manner, and a driving apparatus in the form of mass bodies which can be accelerated pyrotechnically and can be engaged into the drive wheel. The velocity-controlled load limiting device here is located at an intersection point between the two parts of the belt shaft, adjacent to the tensioning device.

The problem resulting therefrom is that the tensioning device upon activation due to the close distance may have a detrimental effect on the load limiting device which is to be activated subsequently. Furthermore, package problems may arise therefrom, as the two technically complex assemblies are located on one and the same side of the belt shaft. Moreover, the velocity-controlled load limiting device in this solution is located between the legs of a U-shaped frame of the seat belt retractor, making the installation more difficult, in particular when the pre-assembled belt shaft shall be inserted into the frame from one side. The particular problem with it is that the openings in the frame cannot be dimensioned in any size.

SUMMARY OF THE CLAIMED INVENTION

It is the object of the invention to provide an improved seat belt retractor with a velocity-controlled load limiting device, in which the above-mentioned disadvantages are avoided.

According to the basic idea of the invention, it is suggested that the first part of the belt shaft is designed as a hollow shaft, that the load limiting device is located on the side of the hollow shaft turning away from the second part of the belt shaft, and that one of the parts of the load limiting device via a transmission device is connected in a rotationally-fixed manner to the second part of the belt shaft through the hollow shaft. With the proposed solution, the tensioning device and the load limiting device can be located on different sides of the first part of the belt shaft, onto which the safety belt is wound. The inventive solution is based on two basic ideas enabling the advantageous arrangement of the load limiting device. First, the first part of the belt shaft is designed as a hollow shaft. Then, a transmission device is provided, which extends through the hollow shaft and enables the load limiting device to be connected to the second part of the belt shaft through the first part of the belt shaft.

It is further proposed that the belt shaft is spring pre-loaded in the winding direction via a torsion spring supporting itself on the retractor frame, and that the torsion spring via the transmission device with one end is connected to the belt shaft. The transmission device thus further fulfills a second function, namely establishing a connection between the torsion spring and the belt shaft, so that the constructional design can be further simplified, more specifically that the spring pre-load required for the functioning of the seat belt retractor can be transmitted to the belt shaft in a particularly simple way.

For this purpose, the transmission device preferably may comprise an adapter element comprising a first attachment for attaching one end of the torsion spring and a second attachment for mounting one of the parts of the load limiting device in a rotationally-fixed manner. The advantage of the proposed solution is that a very simple constructional design can be realized. Moreover, during the load limiting phase the torsion spring thereby is decoupled from the first part of the belt shaft, i.e. the part onto which the safety belt is wound, as via the adapter element it is connected to the second part of the belt shaft, which is locked as a result of the accident. Thereby, the force threshold to be overcome during the load limiting phase is defined solely by the load limiting device.

It is further proposed that the load limiting device is located in a first casing attached to the retractor frame, and that the torsion spring is located in a second casing attached to the first casing. On the one hand, the first casing thus serves to protect the load limiting device, and, on the other hand, it serves to mount the second casing including the torsion spring. The torsion spring thus is located in a hollow space, which on one side is limited by the first casing of the load limiting device, and on the other side is limited by the second casing, so that the torsion spring may not bend to the side.

According to a further preferred embodiment of the invention, it is proposed that the limit of deformation of the transmission device is higher than the load limitation level that can be realized by the load limiting device. With the proposed solution, a lowering of the load limitation level caused by a deformation of the transmission device can be avoided. In particular, the load limitation level acting during the load limiting phase thereby is defined solely by the load limiting device.

It is further proposed that the transmission device is formed by a torsion bar which with a first end is directly or indirectly connected in a rotationally-fixed manner to the second part of the belt shaft, and with a second end is directly or indirectly connected in a rotationally-fixed manner to a part of the load limiting device. So far, such torsion bars are also used as load limiting devices in the form of intentionally plastically deforming torsion bars and can be mass-produced at very low costs. In this case, the choice of the material as well as the thickness provides for the torsion bar to be designed with such a preferable strength that during the load limiting phase it preferably may not deform elastically and least of all plastically. The torsion bar solely serves to establish a connection between the second part of the belt shaft and the load limiting device through the hollow shaft.

It is further proposed that the first part of the belt shaft with an extension engages through an opening in the retractor frame, and that the load limiting device with one part is fixed in a rotationally-fixed manner on the extension at the outer surface of the retractor frame. The load limiting device thus is connected to the first part of the belt shaft at the outer surface of the retractor frame, so that the pre-assembled belt shaft with the load limiting device can be inserted from the side through an opening in one of the legs of the retractor frame, without the need for the load limiting device to be put through the opening as well. A further advantage is to be seen in that, as a result, the first part is mounted between the load limiting device and the point where force is applied by the pulling safety belt, by which favorable force and momentum ratios can be realized.

It is further proposed that between the transmission device or the second part of the belt shaft and the first part of the belt shaft a second load limiting device acting in an initial phase of the load limiting phase within a predetermined rotational angle of the belt shaft is provided. The second load limiting device thus acts parallel to the velocity-controlled load limiting device and thereby increases the load limitation level in the initial phase of the load limitation, until the velocity-controlled load limiting device operates on the desired load limitation level.

In the following, the invention is described in more detail on the basis of a preferred embodiment with reference to the accompanying drawings. The drawings are provided herewith solely for illustrative purposes and are not intended to limit the scope of the present invention.

DETAILED DESCRIPTION OF THE DRAWINGS

Figure 1:
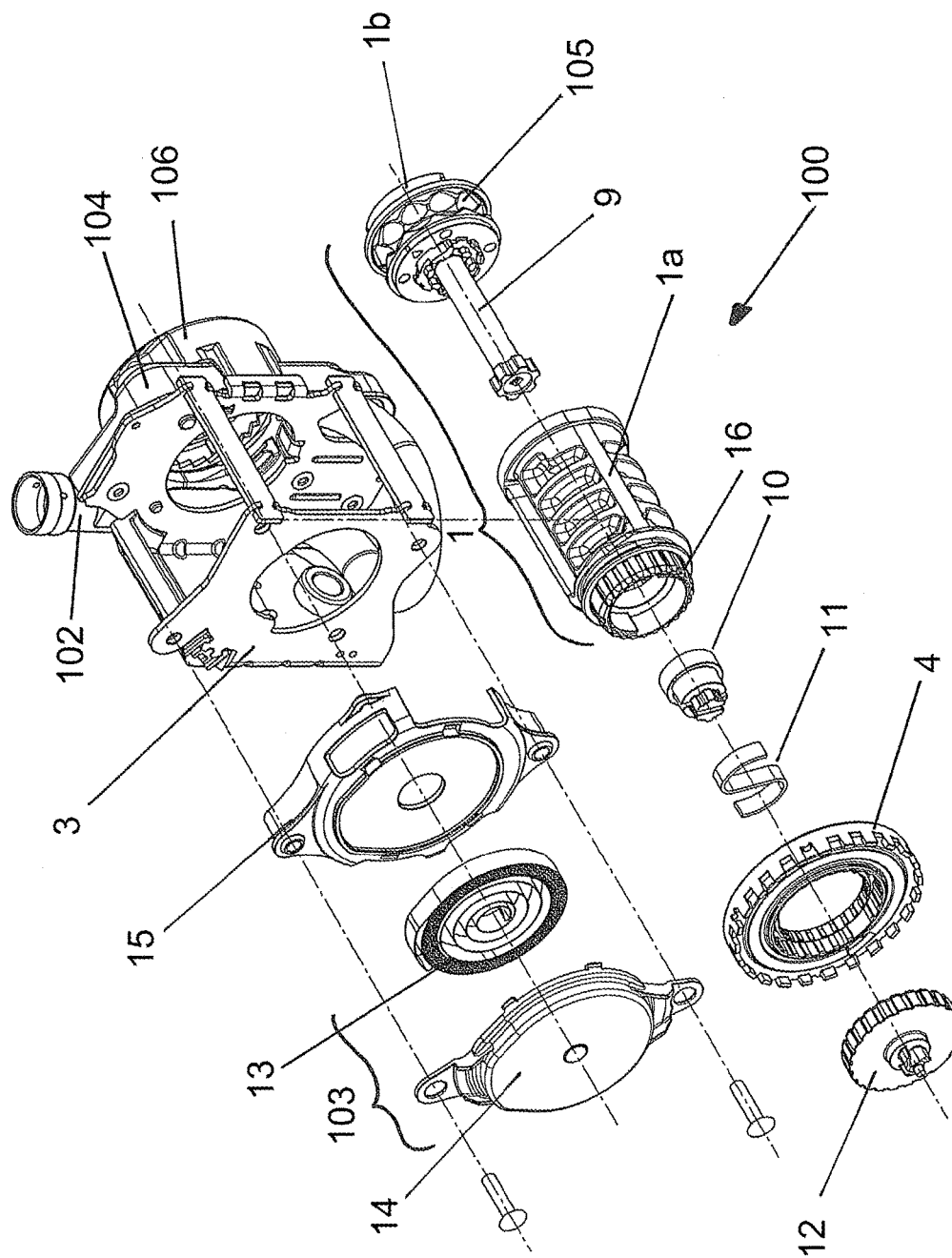
FIG. 1 shows an exploded view of an inventive seat belt retractor.
Figure 2:
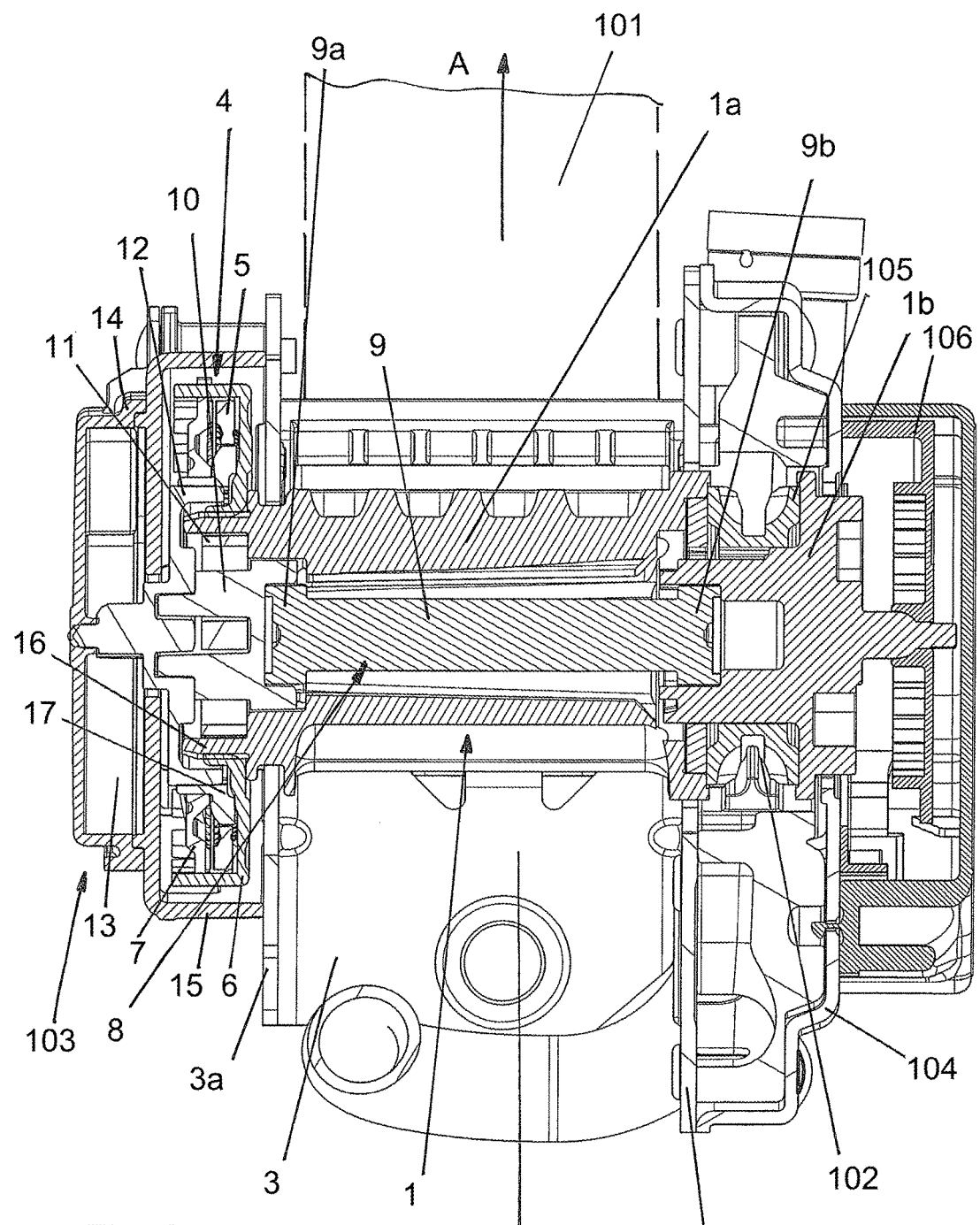
FIG. 2 shows a sectional view of an inventive seat belt retractor.

FIG. 1 shows an inventive seat belt retractor 100 comprising a retractor frame 3, a tensioning device 102 located on the side of the retractor frame 3, and a spring cassette 103 located on the opposite side of the retractor frame 3. The retractor frame 3, as can also be seen in FIG. 2, shows a U-shaped design with two opposite legs 3a and 3b and serves to attach the seat belt retractor 100 to a vehicle as well as to mount an in this case two-part belt shaft 1.

The belt shaft 1 shows a two-part design comprising a first part 1a and a second part 1b connected to each other via a velocity-controlled load limiting device 4. A belt webbing 101, which can be extracted in the arrow direction A against the spring force of a spiral torsion spring 13 located in the spring cassette 103, can be wound onto the first part 1a of the belt shaft 1. The second part 1b of the belt shaft 1, via a locking device in the form of a locking pawl, can be locked relative to the retractor frame 3 and thus also relative to the vehicle when a predetermined belt webbing extraction acceleration or vehicle deceleration is exceeded, so that subsequently the belt webbing extraction is only possible upon the activation of the load limiting device 4.

The load limiting device 4 as a pre-assembled assembly is designed consisting of a first part 6, a second part 7 connected to the first part 6 in a rotationally-fixed manner, and a third part 5 in the form of an oscillating disc located between the two parts 6 and 7. The oscillating disc is mounted in a rotationally-fixed and transverse-displaceable manner on an externally-toothed toothed ring 17. Furthermore, the first part 6 is provided with internal teeth. The whole load limiting device 4 is manufactured as a pre-assembled assembly and in its design as well as operating method corresponds to the load limiting device known from DE 10 2011 008 405 A1, so that this publication in respect of the load limiting device 4 is to be added to the disclosure of the present application.

The tensioning device 102 is fixed in a rotationally-fixed manner on the second part 1*b* of the belt shaft 1 with a drive wheel 105. Furthermore, the tensioning device 102 comprises a casing top 104, which covers the tensioning device 102 towards the outside and is attached to the leg 3*b* of the retractor frame 3 shown on the right in the illustration of FIG. 2. An opening with teeth is further provided in the casing top 104, into which the locking pawl mounted on the second part 1*b* of the belt shaft 1 engages for locking. The locking device can be actuated via a vehicle acceleration sensitive and/or belt webbing extraction acceleration sensitive sensor device known from prior art, which in this embodiment is located in or rather on a side sensor cap 106 which in turn is attached to the casing top 104 of the tensioning device 102.

The first part 1*a* of the belt shaft 1 is designed in the form of a hollow shaft which is pivot-mounted in the openings of the legs 3*a* and 3*b* of the retractor frame 3 and with an externally-toothed extension 16 extends through the opening of the leg 3*a* shown on the left in the illustration of FIG. 2. The load limiting device 4 is slipped onto the external teeth of the extension 16 with the internally-toothed part 6. The second part 1*b* of the belt shaft 1 is connected to the part 5 of the load limiting device 4 via a transmission device, formed by a torsion bar 9, a joint piece 10 and an adapter element 12, via the toothed ring 17. The torsion bar 9 comprises two profiled ends 9*a* and 9*b* with which it is connected to the second part 1*b* of the belt shaft 1 as well as to the joint piece 10 of the transmission device. The joint piece 10 further is connected in a rotationally-fixed manner to the adapter element 12, which in turn is connected in a rotationally-fixed manner to the toothed ring 17 of the load limiting device 4 with external teeth.

The load limiting device 4 thus with the first part 6 is connected to the first part 1*a* of the belt shaft 1, and with the third part 5, via the toothed ring 17, the adapter element 12, the joint piece 10 and the torsion bar 9 is connected to the second part 1*b* of the belt shaft 1. If the second part 1*b* of the belt shaft 1 is locked as the result of an accident, the third part 5 of the load limiting device 4 hence is also locked in a rotationally-fixed manner, so that a relative motion of the first part 1*a* of the belt shaft 1 to the second part 1*b* of the belt shaft 1 is only possible if the third part 5 of the load limiting device 4 performs an oscillatory motion during which it alternately engages into and disengages from teeth of the parts 6 and 7 of the load limiting device 4, as is also described in the publication DE 10 2011 008 405 A1. The load limiting device 4 then is able to perform a load-limited rotational movement with the parts 6 and 7 together with the first part 1*a* of the belt shaft 1 relative to the third part 5 of the load limiting device 4 and the second part 1*b* of the belt shaft 1.

The load limiting device 4 is covered towards the outside by a casing 15 which is attached to the leg 3*a* of the retractor frame 3 shown on the left in the illustration of FIG. 2. A second casing 14, in which the torsion spring 13 is located, is mounted on the casing 15. The second casing 14 together with the torsion spring 13 mounted therein forms the spring cassette 103 which is attached to the casing 15 of the load limiting device 4 as a pre-assembled assembly. The casing 15 further comprises a central opening through which the adapter element 12 of the transmission device extends with an extension on which the inner end of the torsion spring 13, the so-called spring core, is mounted. As the two parts 1*a* and 1*b* of the belt shaft 1 prior to the activation of the load limiting device 4, i.e. with the second part 1*b* of the belt shaft 1 not being locked, can be regarded as one part, the belt shaft 1 as an assembly via the adapter element 12 hence is spring pre-loaded in the winding direction by the torsion spring 13. The adapter element 12 thus serves as a central component for coupling the torsion spring 13 to the belt shaft 1 as well as for connecting the load limiting device 4 to the second part 1*b* of the belt shaft 1.

Furthermore, a strip-shaped deformation element 11, which is centrally mounted on the joint piece 10 and with its free ends bears against or is hung into the first part 1*a* of the belt shaft 1, is provided between the joint piece 10 and the first part 1*a* of the belt shaft 1. The deformation element 11 here forms a second load limiting device acting parallel to the first load limiting device 4 in a limited initial phase of the load limitation. In the initial phase, the load limitation level can be increased by the second load limiting device, until the velocity-controlled first load limiting device 4 operates on the desired load limitation level.

The torsion bar 9 may be designed in the form of a conventional T-bar, however its limit of deformation should be so high that it does not deform elastically or plastically during the load limiting phase. The first part 1*a* of the belt shaft 1 is mounted in the openings of the legs 3*a* and 3*b* between the outer load limiting device 4 and the tensioning device 102, while the second part 1*b* of the belt shaft 1 can be locked in the casing top 104 of the tensioning device 102. With the proposed solution, an overall very harmonious package of the seat belt retractor 100 can be realized, in which the tensioning device 102 and the load limiting device 4 are located on different sides of the first part 1*a* of the belt shaft 1. Furthermore, the spring cassette 103 and the sensor devices, identifiable in view of the arrangement of the sensor cap 106, are located on different sides of the first part 1*a* of the belt shaft 1, by which the package of the seat belt retractor 100 can be further improved.

Furthermore, the tensioning device 102, which upon activation abruptly highly loads the adjacent components, is located as far away as possible from the load limiting device 4 to be activated subsequently, so that the forces acting upon the load limiting device 4 as a result of the activation of the tensioning device 102 are as low as possible.

Figure 3:
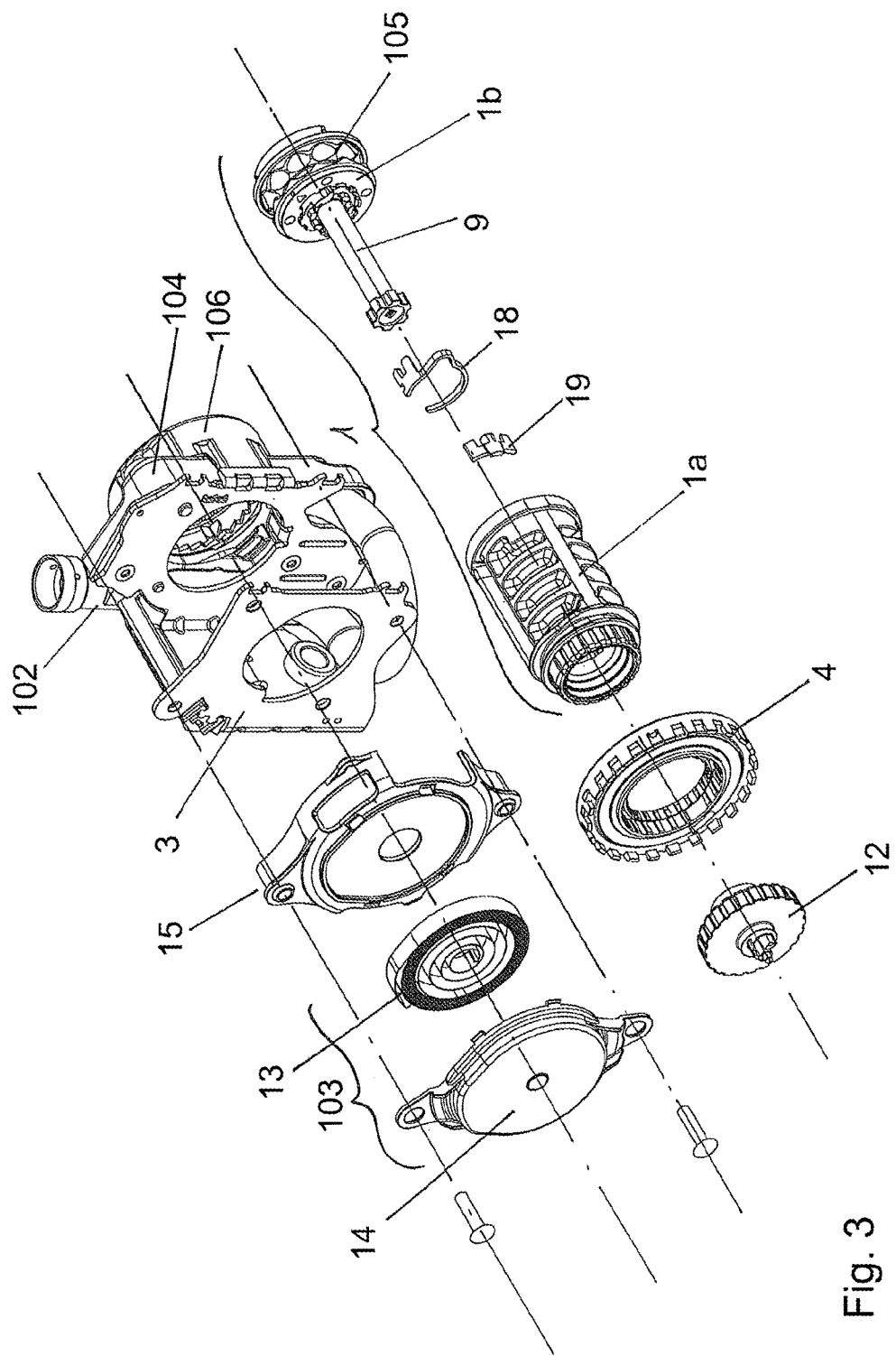
FIG. 3 shows an exploded view of an alternative embodiment of an inventive seat belt retractor.
Figure 4:
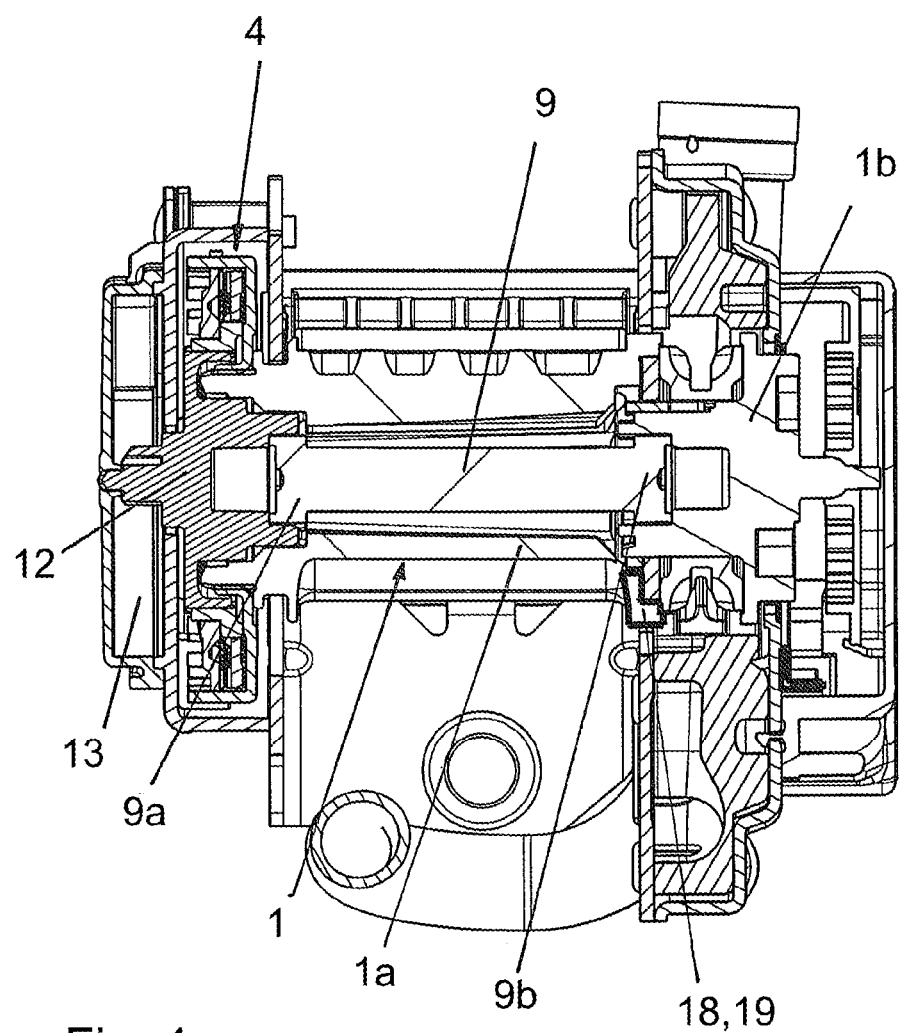
FIG. 4 shows a sectional view of the alternative embodiment.

FIGS. 3 and 4 show an exploded as well as a sectional view of an alternative embodiment of an inventive seat belt retractor. In contrast to the embodiment of FIGS. 1 and 2, the profiled end 9*a* of the torsion bar 9 here is directly connected in a rotationally-fixed manner to the adapter element 12, so that the joint piece 10 is not provided here. The force thus is transmitted from the torsion bar 9 via the adapter element 12 to the first load limiting device 4. The second load limiting device here is formed by a strip-shaped deformation element 18 as well as a baffle plate 19. The deformation element 18 is hung into the second part 1b of the belt shaft 1 in a rotationally-fixed manner, while the baffle plate 19 is hung into the first part 1a of the belt shaft 1 in a rotationally-fixed manner in respect of the rotational axis of the belt shaft 1. The deformation element 18 is lead through the baffle plate 19, so that the baffle plate 19 is moved relative to the deformation element 18 when the load-limited relative motion of the first part 1a of the belt shaft 1 to the locked second part 1b of the belt shaft 1 starts. During this motion, the deformation element 18 is deformed in the baffle plate 19, and this is how the energy dissipation forming the basis of the load limitation of the second load limiting device is effected.

Apart from these differences, the embodiment shown in FIGS. 3 and 4 is identical with the embodiment of FIGS. 1 and 2.

While the above description constitutes the preferred embodiments of the present invention, it will be appreciated that the invention is susceptible to modification, variation and change without departing from the proper scope and fair meaning of the accompanying claims.

The invention claimed is:

1. A seat belt retractor with a velocity-controlled load limiting device for enabling a load-limited extraction of a belt webbing, the seat belt retractor comprising:
   a belt shaft pivot-mounted in a retractor frame, wherein the belt shaft includes a first part and a second part, wherein the first part is a hollow shaft, wherein the belt webbing can be wound onto the first part of the belt shaft, and the second part of the belt shaft is configured to be locked relative to the retractor frame upon the actuation of a locking device,
   the load limiting device located on a side of the hollow shaft remote from the second part of the belt shaft, the load limiting device including
      at least two parts which upon activation of the load limiting device can be moved relative to each other, one of which parts performs an oscillatory motion enabling the load-limited extraction of the belt webbing,
      wherein the at least two parts of the load limiting device bear teeth, with which they alternately engage with and disengage from one another during the relative motion, and
      wherein each of the at least two parts of the load limiting device movable relative to each other is allocated to a different part of the belt shaft, and
      wherein one of the at least two parts of the load limiting device is connected via a transmission device in a rotationally-fixed manner to the second part of the belt shaft through the hollow shaft, and
   a tensioning device located on the second part of the belt shaft, which upon activation abruptly drives the belt shaft in the winding direction.

2. The seat belt retractor according to claim 1, wherein the belt shaft is spring pre-loaded in the winding direction via a torsion spring supported on the retractor frame, and the torsion spring via the transmission device with one end is connected to the belt shaft.

3. The seat belt retractor according to claim 2, wherein the load limiting device is located in a first casing attached to the retractor frame, and the torsion spring is located in a second casing attached to the first casing.

4. The seat belt retractor according to claim 1, wherein the transmission device has a deformation limit higher than a maximum load limitation level that can be realized by the load limiting device.

5. The seat belt retractor according to claim 1, wherein the transmission device is formed by a torsion bar which with a first end is directly or indirectly connected in a rotationally-fixed manner to the second part of the belt shaft, and with a second end is directly or indirectly connected in a rotationally-fixed manner to one of the at least two parts part of the load limiting device.

6. The seat belt retractor according to claim 1, wherein the first part of the belt shaft has an extension extending through an opening in the retractor frame, and wherein the load limiting device with one of the at least two parts is fixed in a rotationally-fixed manner on the extension at an outer surface of the retractor frame.

7. The seat belt retractor according to claim 1, wherein between one of the transmission device or the second part of the belt shaft and the first part of the belt shaft, a second load limiting device, acting in an initial phase of the load limitation within a predetermined rotational angle of the belt shaft, is arranged, the second load-limiting device including a deformation element.

8. A seat belt retractor with a velocity-controlled load limiting device for enabling a load-limited extraction of a belt webbing, the seat belt retractor comprising:
   a belt shaft pivot-mounted in a retractor frame, wherein the belt shaft includes a first part and a second part, wherein the first part is a hollow shaft, wherein the belt webbing can be wound onto the first part of the belt shaft, and the second part of the belt shaft is configured to be locked relative to the retractor frame upon the actuation of a locking device,
   the load limiting device located on a side of the hollow shaft remote from the second part of the belt shaft, the load limiting device including
      at least two parts which upon activation of the load limiting device can be moved relative to each other, one of which parts performs an oscillatory motion enabling the load-limited extraction of the belt webbing,
      wherein the at least two parts of the load limiting device bear teeth, with which they alternately engage with and disengage from one another during the relative motion, and
      wherein each of the at least two parts of the load limiting device movable relative to each other is allocated to a different part of the belt shaft, and
      wherein one of the at least two parts of the load limiting device is connected via a transmission device in a rotationally-fixed manner to the second part of the belt shaft through the hollow shaft, and
   a tensioning device located on the second part of the belt shaft, which upon activation abruptly drives the belt shaft in the winding direction,
   wherein the belt shaft is spring pre-loaded in the winding direction via a torsion spring supported on the retractor frame, and the torsion spring via the transmission device with one end is connected to the belt shaft, and
   wherein the transmission device comprises an adapter element comprising a first attachment for attaching one end of the torsion spring and a second attachment for mounting one of the parts of the load limiting device in a rotationally-fixed manner.

* * * * *